United States Patent [19]
Linden et al.

[11] Patent Number: 5,136,426
[45] Date of Patent: Aug. 4, 1992

[54] LIGHT PROJECTION APPARATUS

[75] Inventors: Paul A. Linden, North Richland Hills, Tex.; Richard W. Pease, Omaha, Nebr.

[73] Assignee: Advanced Laser Projection, Inc., Irving, Tex.

[21] Appl. No.: 661,860

[22] Filed: Feb. 27, 1991

[51] Int. Cl.$^5$ ............................................. G02B 26/10
[52] U.S. Cl. .................................. 359/583; 359/204; 359/589; 358/60
[58] Field of Search .................. 359/17, 204, 212, 216, 359/490, 494, 495, 497, 634, 589, 590, 583; 358/60

[56] References Cited

U.S. PATENT DOCUMENTS

| | | |
|---|---|---|
| 3,507,984 | 4/1970 | Stavis . |
| 3,524,011 | 8/1970 | Korpel . |
| 3,539,245 | 11/1970 | Brienza . |
| 3,549,800 | 12/1970 | Baker . |
| 3,637,929 | 1/1972 | Kaminow . |
| 3,647,956 | 3/1972 | Buck et al. . |
| 3,691,482 | 9/1972 | Pinnow et al. . |
| 3,818,129 | 6/1974 | Yamamoto ........................ 358/60 |
| 3,891,560 | 6/1975 | Chester ............................. 250/461 |
| 4,145,712 | 3/1979 | Spooner et al. .................. 358/60 |
| 4,219,843 | 8/1980 | Takahashi ........................ 358/60 |
| 4,295,159 | 10/1981 | Carollo et al. .................. 358/60 |
| 4,297,723 | 10/1981 | Whitby . |
| 4,562,461 | 12/1985 | Yin .................................. 358/60 |
| 4,611,245 | 9/1986 | Trias ................................ 372/24 |
| 4,613,201 | 9/1986 | Shortle et al. ................... 372/24 |
| 4,668,977 | 5/1987 | Ohno et al. ...................... 358/60 |
| 4,851,918 | 7/1989 | Crowley .......................... 358/60 |
| 4,978,202 | 12/1990 | Yang ............................... 358/60 |
| 4,979,030 | 12/1990 | Murata ............................. 358/60 |
| 5,010,397 | 4/1991 | Hasegawa ....................... 358/60 |

FOREIGN PATENT DOCUMENTS

| | | |
|---|---|---|
| 433945 | 8/1935 | United Kingdom . |
| 438424 | 11/1935 | United Kingdom . |
| 439236 | 12/1935 | United Kingdom . |
| 443393 | 2/1936 | United Kingdom . |
| 451132 | 7/1936 | United Kingdom . |
| 469427 | 7/1937 | United Kingdom . |
| 471066 | 8/1937 | United Kingdom . |
| 474970 | 11/1937 | United Kingdom . |
| 477604 | 12/1937 | United Kingdom . |
| 496964 | 12/1938 | United Kingdom . |
| 2207576A | 2/1989 | United Kingdom . |

OTHER PUBLICATIONS

Funkschau, Farbfernseh—Gross projektion MIT Laser, 1970 (No translation is available).
Baker, Charles E., Laser Display Technology, Dec. 1968, pp. 39–50.
Pease, Richard W., An Overview of Technology for Large Wall Screen Projection Using Lasers as a Light Source, Jul. 1990, pp. 1–13 & FIG. 3.

(List continued on next page.)

Primary Examiner—Carolyn E. Fields
Assistant Examiner—Drew A. Dunn
Attorney, Agent, or Firm—Pravel, Gambrell, Hewitt, Kimball & Krieger

[57] ABSTRACT

A high efficiency light projection apparatus using lasers that optimize all available power output from two lasers to provide a balanced color display is disclosed. The light projection apparatus comprises two laser and light separation means to produce separate red, green and blue light beam components. A combiner cube is provided for combining the blue light beam component of one of the lasers with the blue light beam component of the other laser. Also provided is a second combiner cube for combining a portion of one of the lasers green light beam component with the other lasers green light beam component which combined components are transmitted to a dye laser to provide a red light beam component.

Additionally, a light projection apparatus is disclosed that provides convenient access by the operator and presents an overall narrower configuration for the projector for transportation, installation and alignment purposes.

25 Claims, 4 Drawing Sheets

OTHER PUBLICATIONS

Rocky Mountain Instrument Co., $\lambda/4$, $\lambda/2$, Crystal Quartz 87-6-015.
Rocky Mountain Instrument Co., Dichroic Filters 87-06-029.
Rocky Mountain Instrument Co., Polarizing Beamsplitter Cubes, BK-7A, 87-6-041.
Rocky Mountain Instrument Co., High Power Laser Polarizers BK-7A, 87-6-042.
European Patent Application No. 83300157 to Dwight Cavendish Holdings Limited relating to abovementioned U.S. Pat. No. 4,613,201 though specifications are not identical.

LIGHT PROJECTION APPARATUS

BACKGROUND OF THE INVENTION

1. Field of the Invention

This invention relates generally to a light projection apparatus and, more particularly, but not exclusively, to an apparatus for use in the projection of television or video pictures and similarly derived images of computer generated or other visual information onto large screens.

2. Description of the Prior Art

Though attempts have been made to produce a commercially acceptable laser large screen color projection apparatus, the primary problem with the display technologies that use lasers as a light source has been the inadequate display brightness as compared to manufacturing and/or operating costs. This is due to the fact that prior devices did not fully utilize all of the available light output from two lasers to produce a properly balanced color display.

Though various individual components of such an improved system have been available for some time, a brighter color display achieved through proper balanced and selected combination of the red, green and blue light beam components of two or more lasers has not been achieved in the industry. Some of these components necessary for a light projection apparatus have been disclosed by Charles E. Baker in Texas Instruments Inc.'s paper published in the *I.E.E.E. Spectrum* in December 1968. Also, certain components were disclosed in the 1970 article entitled, Funkschau, 1970, Heft 4, *Farbfernseh-Großprojektion Mit Laser.*

FIG. 1 discloses a typical prior art arrangement using two lasers to produce a light beam that is scanned onto a viewing surface. In FIG. 1, a first Argon ion laser transmits a light beam that is reflected 90° by a mirror $R_1$ to a dye laser. The Argon ion lasers in FIG. 1 produce blue, green and blue/green light beam components that contain all of the wavelengths required for full color video displays except for the red light beam component. Therefore, a dye laser is required to be used in combination with the Argon laser to produce the red light beam component. This dye laser produces a red light beam component reflected by mirror $R_2$ that is transmitted through modulator $M_1$ and lens $L_1$ and then transmitted to the scanning means $S_1$ and $S_2$ which projects the light from $S_2$ onto a viewing surface. The second Argon ion laser produces a light beam that is reflected 90° by mirror $R_3$ to a dichroic beam splitter $D_1$ which permits straight-line transmission of the blue-green and green light beam components but reflects the blue light beam component 90° to a second modulator $M_2$ and lens $L_2$ which is then in turn reflected by mirror $R_5$ to the scanning means for projection onto the viewing surface. The remaining straight-line light beam components are transmitted to a second dichroic beam splitter $D_2$ which reflects the green light beam component 90° to its modulator $M_3$ and lens $L_3$ then onto the scanning means to the viewing surface. The remaining blue-green light beam component not reflected to modulator $M_3$ is transmitted to beam stop $B_1$.

Another prior art device using a laser and a dye laser is found in U.S. Pat. No. 4,613,201 which discloses the use of a single Argon laser which produces a light beam. The blue light beam component is separated from the other wavelengths using a dispersing prism $P_1$, as seen in FIG. 2. The blue light beam component is reflected to its modulator $M_2$ and then transmitted to the scanning means for projection onto a viewing surface. All of the remaining wavelengths are transmitted to a polarizing prism $P_2$ which reflects a portion of the beam for the green light beam component 90° while transmitting the remaining portion to the dye laser. The green light beam component and red light beam component are passed through their respective modulators $M_3$, $M_1$ and then onto the scanning means for projection onto the viewing surface, as best seen in FIG. 2.

The production of the red light beam component is currently achieved using a diode laser, krypton ion laser or a dye laser. Diode lasers do not provide enough power at the required wavelength. The red light component produced by the krypton ion laser requires four-to-five times the power as the comparable power of an Argon ion laser. Also, the blue and green light beam components of the krypton laser are quite weak compared to its red component. The krypton red light component is at a wavelength that the human eye is not as sensitive to and therefore makes it difficult to balance with the other colors to give a complete color scale with reasonable power.

The Argon ion laser in combination with a dye laser is therefore preferred in providing the blue-green-red light beam components. The dye laser preferably converts light energy of a shorter wavelength to a longer, tuneable wavelength.

These above light projection devices, while providing a viewable display on a large screen, have not provided a desirable balanced color display. For example, when using the single Argon ion laser of U.S. Pat. No. 4,613,201, as illustrated in FIG. 2, the 454–476 nm blue, generally defined as the blue light beam component, would be taken out of the remaining light beam transmitted to the polarizing prism $P_2$.

The polarizing prism $P_2$ is utilized to divide the remaining beam containing 488 nm and 514 nm into two beams; one for the green beam and the other for the dye pump beam. The ratio of the beam intensities is adjustable by varying a stress plate positioned just before $P_2$. This optic will vary the polarization of the beam and $P_2$ will then divide the beams based on the polarization ratios. This method will vary the intensities of the transmitted and reflected beams but is not wavelength selective. The ratio of 488 nm and 514 nm will remain the same and both wavelengths will be present in both beams. Allowing 488 nm into the green beam will diminish the color distinction between blue and green and not provide a proper color balanced image or display. This one laser layout will also not allow for full use of all lines due to the fact that if the green output is adjusted to match the blue output there will be an excess of red output or if the red output is adjusted to the blue output there will be an excess of green output.

In the two laser system, as shown in FIG. an Argon ion laser is used for the blue and green light beam components and another Argon laser is used only for supplying the energy for the dye laser and subsequently the red light beam component. In this system, there is more than an adequate amount of 514 nm green (green light beam component) for a balanced color display as compared to the amount of 454–476 nm blue (blue light beam component) and 610 nm red (red light component).

More particularly, when using the two Argon ion lasers and a dye laser system of FIG. 1, all the 514 nm green and 488 nm to 501 nm blue-green, generally defined as the blue-green light beam component, of one of the lasers participates in producing the red light beam component but the blue light beam component (454-476 nm) is wasted since it does not significantly contribute to the production of the red component in a dye laser. In the other Argon ion laser, the 454-476 nm blue is used for the blue light component and 514 nm green is used for the green light beam component; however, the blue-green light beam components are either not produced using special optics in the laser or are separated and dissipated. Since a balanced color display requires a Green:Blue:Red ratio of approximately 1:1:1.1 and the typical two laser system produces a ratio of 7:3:4, the two laser system produces greater than twice as much green as blue, and the excess green is lost.

Therefore, there has been a long felt need in the industry to provide the highest light output power competitive with other large screen image projection technologies by fully utilizing all of the available power output from two lasers.

Also, the prior art light projection systems have undesirably positioned the two lasers on each side, or in the case of a single laser system to one side, of the central location usually occupied by the lenses/optics, modulators, mirrors, beam splitters and other components required in a light projection system. This inherently requires the housing for the system to be wider and requires the operator to have to reach over at least one laser while performing set up or maintenance of the system. Therefore, it would be desirable to provide a light projection apparatus that eliminates the positioning of ion lasers at one or both sides of these components to provide convenient access for maintenance and/or operation of the system.

SUMMARY OF THE INVENTION

According to the invention, a high efficiency light projection apparatus using two lasers is provided that optimizes all available power output from two lasers to provide a balanced color display. The light projection apparatus comprises two lasers with light separation means for producing separate red (using a dye laser), green and blue light beam components. Combiner means are provided for combining the blue light beam component of one of the lasers with the blue light beam component of the other laser to operably project a brighter light onto the viewing surface. Also provided is another combiner means for combining a portion of one of the laser's green, and blue-green light beam components with the other laser's green and blue-green light beam components which combined beam component is transmitted to a dye laser to provide a red light beam component for projection onto the viewing surface. Alternatively, the red light beam component from a laser such as a krypton ion laser, without using a dye laser could be utilized. The krypton laser blue light beam component could be combined with the other laser blue light beam component.

Additionally, according to the invention, an improved light projection apparatus comprising at least one laser for producing a light beam is provided along with the optics, modulators, beam splitters, and other components required for a light projection system. Advantageously, the lasers are positioned below the optics, modulators, beam splitters, and other components to operably provide convenient access to those components by the operator to present an overall narrower configuration for the projector for transportation, installation and alignment purposes.

BRIEF DESCRIPTION OF THE DRAWINGS

The objects, advantages and features of the invention will become more apparent by reference to the drawings which are appended hereto and wherein like numerals indicate like parts wherein an illustrated embodiment of the invention is shown, of which.

DESCRIPTION OF THE PREFERRED EMBODIMENT

Figure 1:
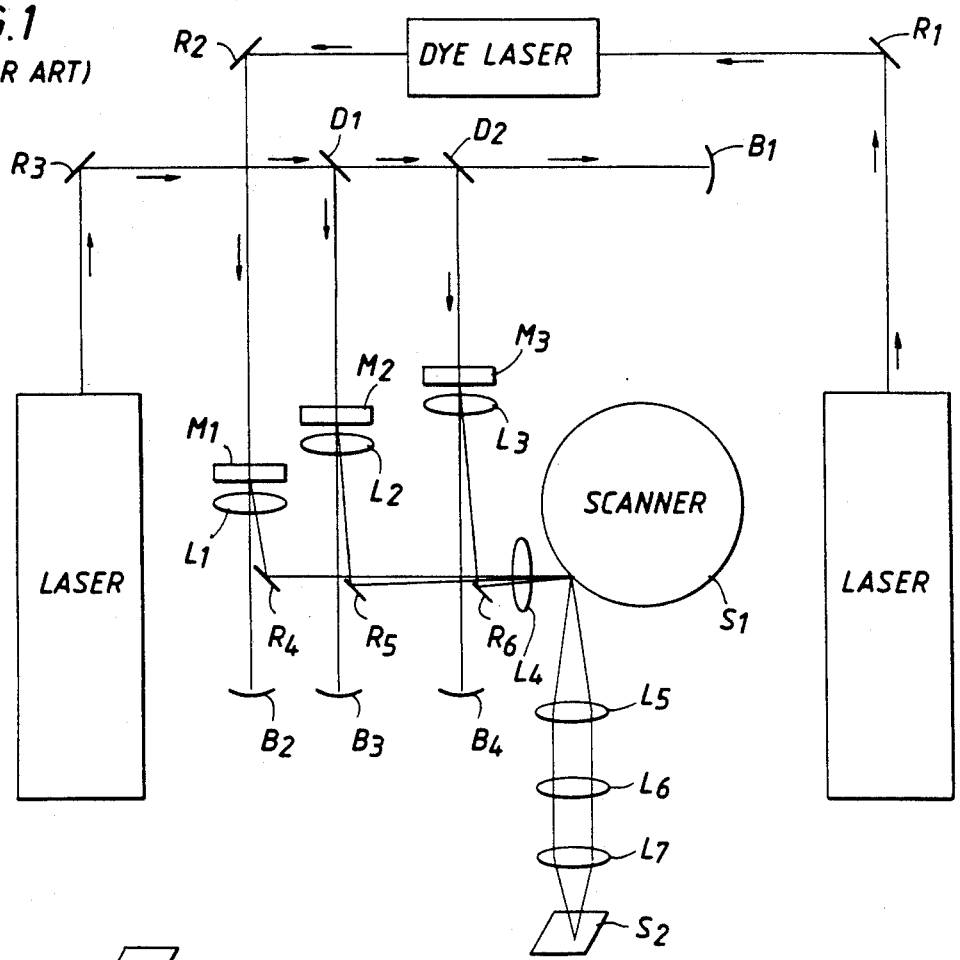
FIG. 1 is a schematic of a prior art configuration of a laser light projection apparatus.

Before a detailed description of the preferred embodiment of the present invention and its alternatives is provided, the prior art product as shown in FIG. 1 will be discussed in detail.

In FIG. 1, a two Argon ion laser system is provided. One laser transmits a light beam to mirror $R_3$ that is reflected 90° to beam splitter $D_1$. The beam splitter $D_1$ reflects the blue light beam component 90°, wavelengths 476 nm and shorter, to its acoustic-optic modulator $M_2$. All of the longer wavelength light is transmitted in a straight line from mirror $R_3$ to beam splitter $D_2$. Beam splitter $D_2$ then reflects wavelengths 514 nm and longer 90° towards the acoustic optic modulator $M_3$ for the green light beam component. The remaining 488 nm, 496 nm and 501 nm blue-green light beam components are transmitted and dissipated by a beam stop $B_1$. Alternatively, the Argon ion laser could be fabricated so that it does not produce wavelengths between 488 nm and 501 nm, thereby eliminating the need for beam stop $B_1$ and beam splitter $D_2$. In this alternative embodiment (not shown), the beam splitter $D_2$ component could simply be a mirror, such as $R_3$.

Also disclosed are 300 millimeter cylindrical lenses $L_1$, $L_2$ and $L_3$ that focus in the horizontal direction. These 300 mm lenses are placed between their respective modulator and the scanning means $S_1$ and $S_2$ as shown in FIG. 1.

These 300 millimeter cylindrical lenses $L_1$, $L_2$ and $L_3$ allow for individual focus of the red, green and blue light beam components; sharply delineate the deflected beam so that it can be separated from the non-deflected beam from the modulator; and focus the beam to a vertical line on the rotating line scanning polygonal mirrors so the entire scan line falls evenly on one of its facets.

The other laser transmits its light beam towards mirror $R_1$ that reflects the beam 90° into the dye laser which produces the red light beam component. The red component is then transmitted towards mirror $R_2$ and reflected 90° to its modulator $M_1$ and is passed through 300 millimeter lens $L_1$. The red component is then reflected by mirror $R_4$ to the scanning mirror $S_1$ just missing mirrors $R_5$ and $R_6$ for the blue and green light beam components. Unmodulated light beams for the red, blue and green lines are dissipated by beam stops $B_2$, $B_3$ and $B_4$, respectively. The mirror $R_5$ is positioned so that the modulated blue light beam component is reflected towards scanning mirror $S_1$ and the modulated beam from mirror $R_4$ of the red light beam component just misses the mirror $R_5$. Likewise, the green light beam component is directed by its mirror $R_6$ to the scanning mirror $S_1$. The mirror $R_6$ is positioned out of the line of travel of both the red light beam component from mirror $R_4$ and the blue light beam component from mirror $R_5$ on their way to scanning mirror $S_1$.

Alternatively, dichroic mirrors, as disclosed in U.S. Pat. No. 3,818,129 and shown in FIG. 7, could be used for reflecting the blue and green light beam components while allowing transmission of the red and blue light beam components thereby eliminating the need for the acoustic delay modulators $M_1$, $M_2$ and $M_3$ or electronic delays. U.S. Pat. No. 3,818,129 is incorporated herein for all purposes.

Lens $L_4$ is a 100 mm cylindrical lens whose power is in the vertical direction to focus the modulated beams on lens $L_6$. Lenses $L_5$ and $L_7$ are spherical achromats that act as relay lenses taking the horizontal sweep of the beam emerging from scanning mirror $S_1$ and focusing it on the frame scanner $S_2$. Lens $L_5$ is fixed at 55 millimeters, but lens $L_7$ can be varied from 55 to 160 millimeters with the width of the projected image varying inversely with its focal length. Lens $L_6$, between lenses $L_5$ and $L_7$, is a 25 millimeter cylindrical lens whose power is also in the vertical direction. Lens $L_6$ in combination with the 100 millimeter cylindrical lens $L_4$ corrects for any vertical errors in the facets of the typical rotating line scanning polygon mirror $S_1$. Though a scanning means has been disclosed for the present invention, other conventional scanning means could be used with the present invention, such as the scanning means disclosed in U.S. Pat. Nos. 4,613,201; 4,511,245; 4,979,030; or 4,978,202, that are incorporated by reference herein for all purposes.

Figure 2:
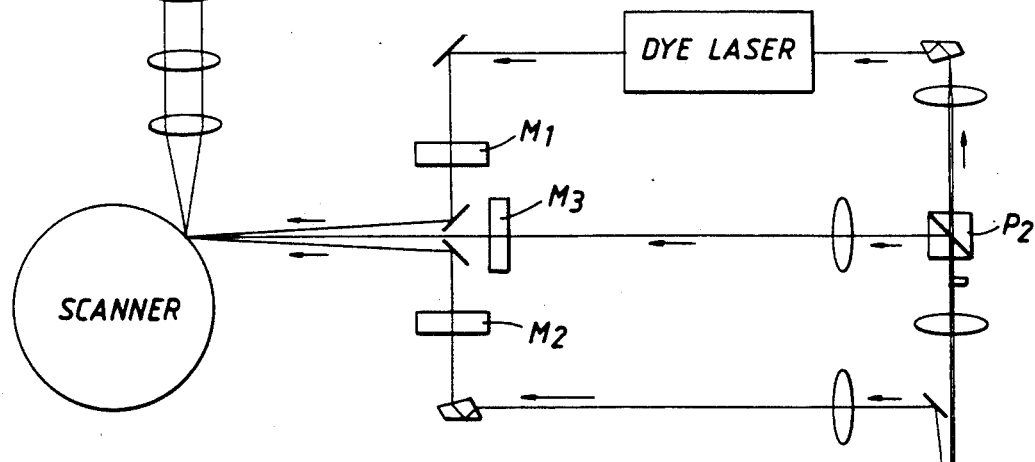
FIG. 2 is a schematic of another prior art laser light projection apparatus as disclosed in U.S. Pat. No. 4,613,201.

The components and some operation of the prior art embodiment shown in FIG. 2 are disclosed in U.S. Pat. No. 4,613,201, that is incorporated by reference herein for all purposes.

Figure 3:
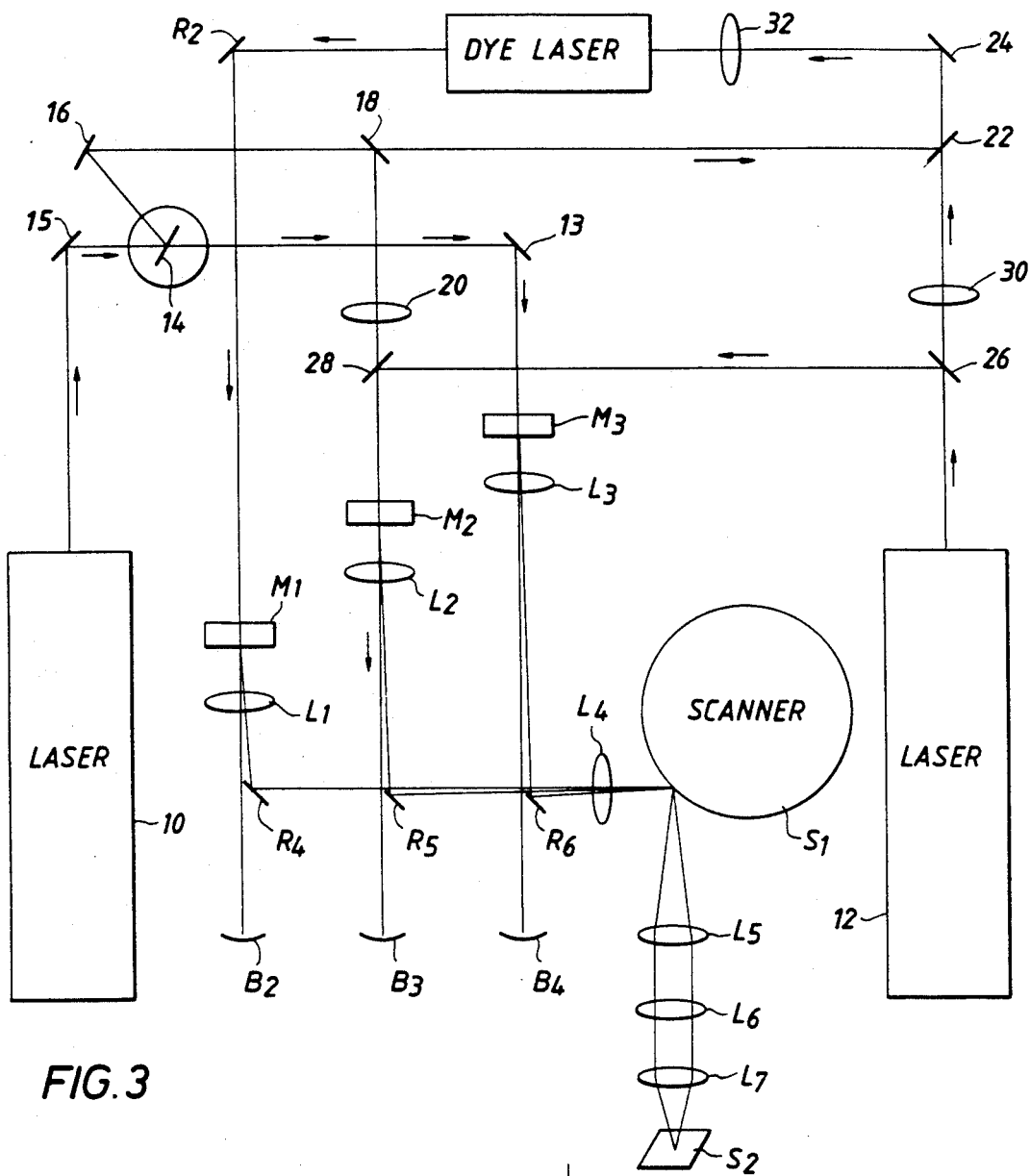
FIG. 3 is a schematic of the present invention light projection apparatus.

Turning now to FIG. 3 a schematic of the present invention is provided. The preferred ion lasers currently used are Coherent Innova Model #310 argon ion lasers that is rated at 10 watts with active stabilization, to provide power and beam pointing stability. Pointing stability is extremely important with the utilization of combiner cubes in order to maintain alignment of the combined beams. The output mirrors are changed from the normal 10 meter radius of curvature to Part #0903-040-00-G 6 meter output coupler. These items are all standard products from Coherent, Inc., Palo Alto, Calif. In FIG. 3, an Argon ion laser 10 transmits a light beam to mirror 15 which reflects the beam to 1" round dichroic beam splitter 14. Preferably, splitter 14 transmits approximately 70% of the 514 nm green light beam component striking it to mirror 13 and reflects the remaining approximately 30% of the 514 nm green light beam component and substantially all of the shorter wavelengths, including the blue and the blue-green light beam components to mirror 16 and then to splitter 18. Adjusting means 14 is preferably a dichroic beam splitter, but could also be a prism, diffraction grating, holographic material or other separation technique known in the art. Adjusting means 14 is preferably positioned on a rotatable table with mirror 16 for adjusting the proportion of transmission to reflection, as will be discussed below in detail.

Dichroic mirror 18 then reflects all of the blue light beam component towards ½ wave plate 20. All of the remaining light beam components are transmitted through dichroic mirror 18 which now contains no blue light beam component, but all of the blue-green light beam components from 488–501 nm and 30% of the green light beam component from laser 10. These remaining wavelengths strike combiner means 22 which reflects this light 90° towards mirror 24.

Argon ion laser 12 produces a light beam that is reflected off dichroic beam splitter 26 and reflects all of the blue light beam component from laser 12 to combiner means 28, but transmits in a straight line all of the 488–501 nm (blue-green light beam component) and all of the 514 nm (green light beam component) towards the combiner means 22.

Figure 6:
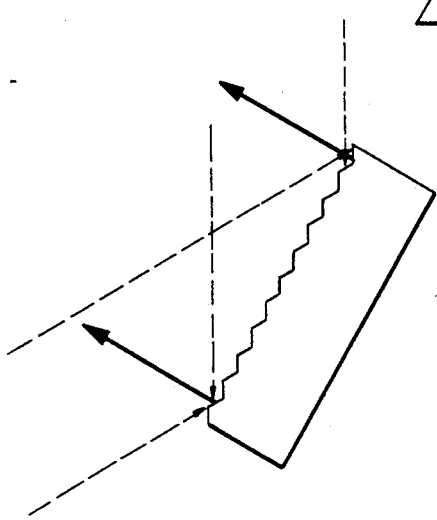
FIG. 6 is an enlarged view of a serrated plate beam combiner means that may be used in the present invention to provide an alternative embodiment.

Preferably, the combiner means 22 and 28 are polarizing combiner cubes but could be a serrated combiner plate, as shown in FIG. 6, or the beams could also be parallel or converging using precisely positioned mirrors. However, the polarizing combining cube is preferred since the dye laser input works best with the small beam produced by the polarizing combiner cube. As laser 12 normally produces vertically polarized light, a ½ wave plate 30 is provided to rotate the plane of the light 90°. The polarizing combiner means 22 then reflects the vertically polarized light from splitter 18 and transmits the horizontally polarized light from splitter 26 to mirror 24.

Though the combiner means 22 contains all of the 514 nm green light beam component and 488 to 510 nm blue-green light beam component from laser 12, it does not contain the blue from laser 12. This is not a disadvantage since the 454–476 nm blue does not significantly participate in the production of the red light beam component in the dye laser. Combined with all the green light beam component and blue-green light beam component from laser 12 are 30% of the green light beam component and all of the blue-green light component from laser 10. Since the dye laser is sensitive to the polarization of the input beam, which now contains energy with both vertical and horizontal polarization at mirror 24, another ½ wave plate 32 is provided to adjust the polarization of the combined dye laser input beam. Plate 32 is adjustable about the beam axis to maximize the dye laser output.

Figure 7:
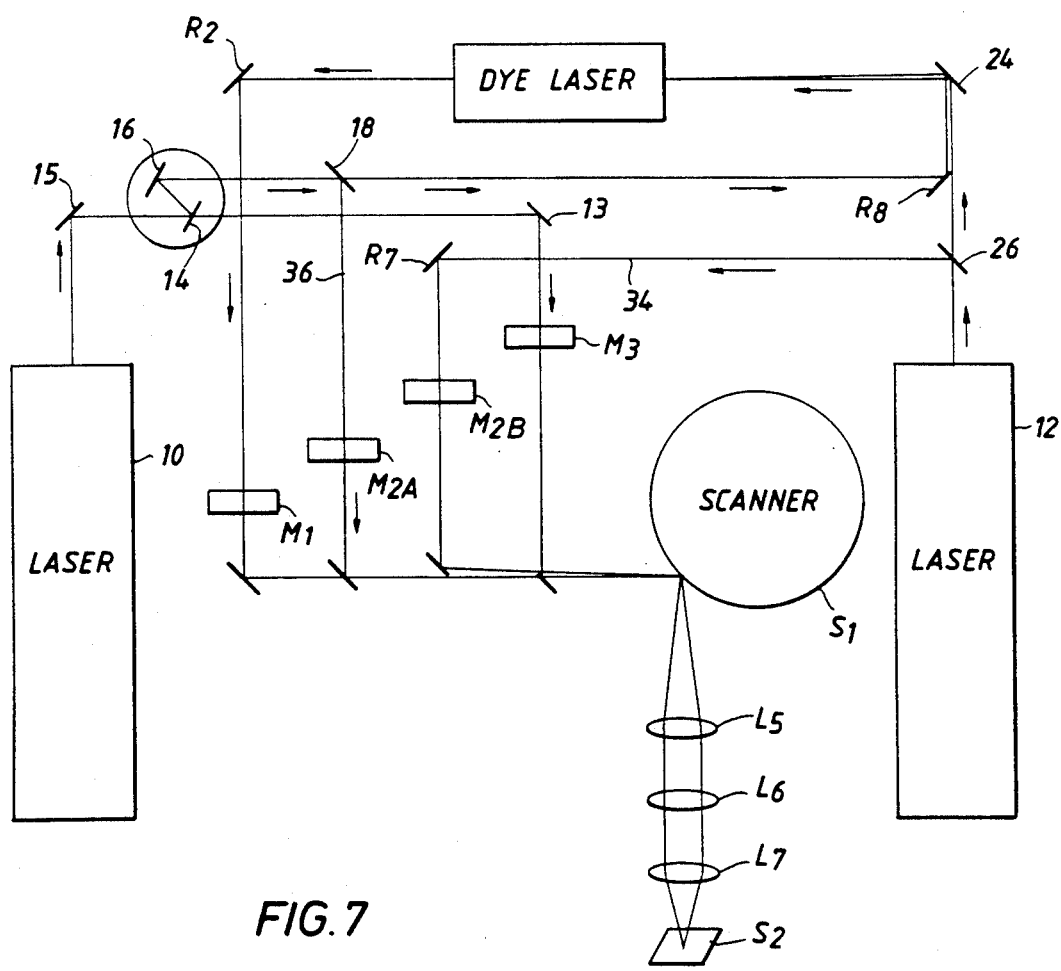
FIG. 7 is an alternative embodiment for the light projection apparatus of the present invention.

The blue light beam component reflected from splitter 26 to the combiner means 28 is a vertically polarized light that is reflected 90° towards its modulator $M_2$. As stated before, combiner means 22 and 28 could be a serrated plate, as shown in FIG. 6, or the beams could be in parallel, as shown in FIG. 7, as will be discussed below in detail or could be converging beams.

With the ½ wave plate 20 rotating the polarization of the original beam from splitter 18, the blue light beam component from laser 10 is transmitted through combiner means 28. The beam transmitted from modulator $M_2$ now contains all of the 454–476 nm blue light beam component from both lasers 10 and 12. Also, 70% of the 514 nm green light beam component from laser 10 via mirror 13 is transmitted through modulator $M_3$.

Advantageously, portions of the light beam from lasers 10 and 12 are combined at combiner means 22 to pump a single dye laser as illustrated, though two dye lasers could be used and the red light beam component thereafter combined. Alternatively, parallel or converging krypton laser or other laser red light beam components could be used with two modulators, similar to the two blue modulators of FIG. 7. The use of one dye laser is preferred since when using 514 nm green and 488–501 nm blue-green to pump a dye laser to produce the red light beam component, the dye laser pump power input to the red output relationship is not linear. It has been found that in a continuous wave dye laser, initial increments of pump power produces no output, but after a threshold is reached the remaining increases in pump power cause increase in output which is approximately linear. It has been further found that two lasers producing two vertically polarized beams to one dye laser will give more output than two dye lasers will give using the same two lasers separately. However, using the polarized combining cubes for the combiner means 22 in the preferred embodiment of FIG. 4 of the present invention, more red light beam output is produced than with one laser pumping one dye laser but slightly less than two vertical polarized beams pumping two dye lasers.

Since the first increment of light from laser 10 exceeds the dye laser threshold, all of the additional energy received from laser 12 is effective in pumping the dye laser at a linear rate. Thus, the red light beam component produced is about 110% of the power of the blue light beam component and the green light beam component at their respective modulators. This provides the highly desirable Green (514 nm):Blue (454 nm to 476 nm):Red (610 nm) ratio required for a balanced color display of approximately 1:1:1.1 that produces the best white color.

When the serrated combiner plate, shown in FIG. 6, replaces combiner cubes 22 and 28, it also eliminates the need for the ½ wave plates 20, 30 and 32. This alternative embodiment gives a wider combined beam than with the polarizing combining cubes which is potentially less desirable.

Figure 4:
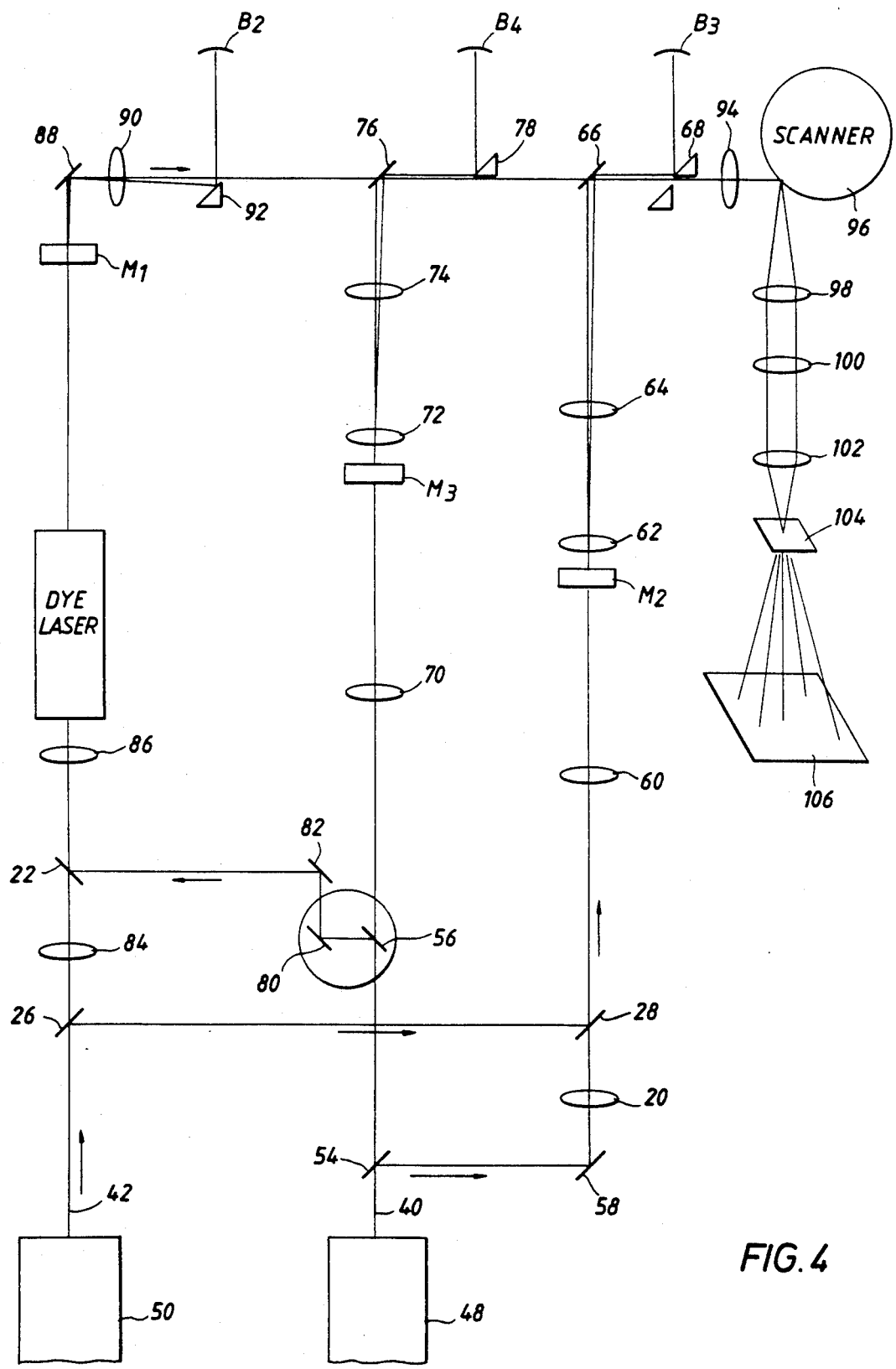
FIG. 4 is a schematic of the preferred embodiment of the light projection apparatus of the present invention configured to facilitate access to the adjustable components of the present invention.

Turning now to FIG. 7, another alternative embodiment to the present invention discloses other types of combiner means for the light beam components comprising converging beams for the dye laser and separate modulation paths for each blue light beam component. In FIG. 7, the blue light beam component 34 from laser 12 is separately modulated from the blue light beam component 36 from laser 10. The two blue light beam components from lasers 10 and 12 are transmitted to the scanning mirror $S_1$ separately. Splitter 26 reflects the blue light beam component to mirror $R_7$ to its modulator $M_{2B}$. Also shown in FIG. 7, the beams entering the dye laser converge on an optic of the dye laser. Note the addition of mirror $R_8$ to reflect the light beam component from splitter 18 to mirror 24. Preferably, higher radius laser cavity mirrors are used to increase the laser output power by allowing the beam mode to move from $TEM_{00}$ to $TEM_{01}$. This alternative embodiment, while functional, is more difficult to adjust than with the use of the combiner means 22 and 28, as shown in FIGS. 3 and 4. However, this alternative embodiment has potential for more power from the dye laser because both beams have optimum polarization. In the utilization of two dye lasers separate red component modulators are used similar to the implementation of the two parallel blue modulators $M_{2A}$ and $M_{2B}$ shown.

All of the optical elements are provided for modifying the red, green and blue light beam components through the system to improve the efficiency of the output. Any element that changes the nondivergent nature of laser light has a like optical element to return the laser beam back to its nondivergent nature thereby providing a raster output with infinite focus adapted for off axis, multi-plane, and irregular screen surfaces.

NEW CONFIGURATION FOR LIGHT PROJECTION APPARATUS

Figure 5:
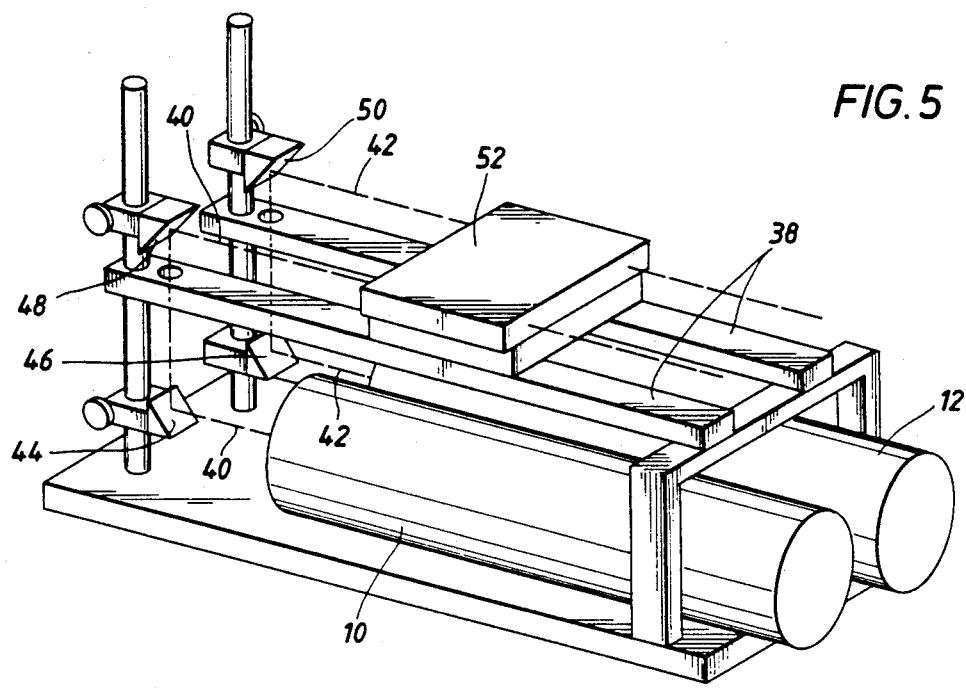
FIG. 5 is a perspective view of the light projection apparatus of the preferred embodiment of the present invention generally illustrating the placement of the lasers relative to the other components.

Turning now to FIGS. 4 and 5, the preferred embodiment of the invention is disclosed. In the preferred embodiment, the lens or optic means and dye laser are positioned on a supporting structure 38 above the Argon ion lasers 10 and 12. Prior art devices have placed Argon ion lasers on each side of the optics which prevent easy access to the many adjustable components required for the maintenance and/or operation of the light projection apparatus. By placing the Argon ion lasers 10 and 12 below the support structure 38, the operator is better positioned to adjust the required components. As seen in FIG. 5, the light beams 40,42 from lasers 10 and 12, respectively, are reflected upwardly off mirrors 44,46 to their respective mirrors 48,50 thereafter reflected again into the box 52. Box 52 is preferably closer to mirrors 48 and 50, at one end of the apparatus housing, but is shown in a more central position for illustration of the beams 40,42. Box 52 houses the components discussed below and shown in FIG. 4 including the dye laser.

Turning next to FIG. 4, the preferred configuration and components for the present invention, as represented in block form in FIG. 5 of box 52, are provided. As seen, the light beams 40 and 42 are reflected off mirrors 48 and 50, respectively. In FIG. 4, the light beam 40 is then transmitted to 1" round beam splitter 54 that transmits 90+% of the 488–514 nm green and blue-green light beam components and reflects 90+% of the 454–476 nm blue light beam component to mirror 58. The blue light beam component is then transmitted through a ½" round zero order halfwave plate optimized for use at 465 nm, designated as 20, and is further transmitted through the combiner means 28, preferably a ½" polarizing beam splitter cube broadband coated 454–514 nm LAMBDA/10 R.M.I. TYPE PC13-K. The blue combiner cube 28 is specially coated to allow P-polarization transmission of 454–476 nm at 94.5–95% while allowing less than 0.2% transmission of S-polarization.

Light beam 42 is transmitted to the 1" round beam splitter 26 which transmits 90+% of the 488–514 nm blue-green and green and reflects 90+% of the 454–476 nm blue light beam component to combiner means 28. These combined blue light beam components are then transmitted to the 1" cylindrical lens 60, 100 mmFL, transmission 99.5% at 454–476 nm through the modulator $M_2$ onto a 1" cylindrical lens 300 mmFL, transmission 99.5% at 454–476 nm, designated as 62. Lenses 62, 72 and 90 must be placed after their respective modulators, because if placed before, the convergent nature of the beam reduces modulator efficiency. Thereafter, the beam is transmitted through 1" cylindrical lens 64, 100 mmFL, transmission 99.5% at 454–476 nm to a 1" beam splitter 66 that reflects 99% of 454-476 nm and transmits 95% of 514-640 nm. Lenses 60 and 64 shape the beam and have power only in the vertical direction. This forces the beam into a horizontal line on the modulator $M_2$. Because the acoustic energy in the modulators are not consistent from top to bottom, this action places all the optical energy in the strongest acoustic field, thus optimizing the efficiency of the modulator. In the past, the acoustic modulation would have been forced into a vertical line, so that the variations in the information in the relatively slow moving acoustic energy would transverse the narrow light beam for as short a duration as possible, thus increasing the resolution. However, the sound takes a relatively long time to transverse the beam. A one dimensional image of the information in the sound is thus imposed upon the modulated beam. The image would move through the beam at the speed of sound in the modulator. In the preferred embodiment of the projector, the sound field is many picture elements wide. However, this image is projected on the screen in the form of a horizontal line, whose width contains the same number of picture elements in the modulator. Moreover, the horizontal scanning process moves the beam, with its moving acoustic image, across the screen at exactly the same speed as the acoustic image, but in the opposite direction. Thus the dynamic acoustic image is made to stand still on the screen for the duration of the time that each parcel of acoustic information is retained in the beam in the modulator. This placement of a pair of cylindrical lenses has several advantages. The first is to increase the efficiency of the modulator. Another is to allow the individual focus of each beam on the screen independently of the others. Red focus is adjusted using the final projection lens 102 in combination with lens 100 as red is the least divergent of the beams. By moving lenses 64 and 74 toward and away from modulators $M_2$ and $M_3$, respectively, the blue and green beams can be focused independently to match the red focus. Unmodulated light is reflected to beam stop $B_3$ via mirror 68.

The light transmitted through beam splitter 54 travels to 1" round beam splitter 56. Splitter 56 reflects 30% of the 514 nm green and substantially all of the shorter frequencies ranging from 488-501 nm (blue-green). The remaining 70% of the 514 nm green is transmitted in a straight line onto 1" cylindrical lens 70, 100 mmFL, transmission 99.5% at 514 nm. This green light beam component is then transmitted through its modulator $M_3$ and then to the 1" cylindrical lens 72, 300 mmFL transmission 99.5% at 514 nm and then to the 1" cylindrical lens 74, 100 mmFL transmission 99.5% at 514 nm which is then reflected off the 1" beam splitter 76 that reflects 99% at 514 nm and transmits 95% of 595-640 nm. Lenses 70,74 operate similar to lenses 60,64 discussed above. The unmodulated light from the green light beam component is transmitted via mirror 78 to beam stop $B_4$.

The reflected wavelengths at beam splitter 56 are transmitted to mirror 82 via mirror 80. Both splitter 56 and mirror 80 are preferably located on a rotatable turntable which allows adjusting of the optics incident angle. Mirror 80 is co-mounted on the turntable with splitter 56 so that the beam from mirror 80 to mirror 82 remains parallel to the beam from splitter 54 to splitter 56, even as the angle of the splitter 56 and mirror 80 are changed. The incident angle can vary the transmitted percentage of the 514 nm green light beam component between 50% and 90%, though 70% is preferred. The 30% of the 514 nm and substantially all of the shorter frequencies ranges from 488-501 nm, which are now vertically polarized, are then reflected from mirror 82 to the ¼" polarizing beam splitter cube broadband 454-514 nm, designated 22. The dye pump combiner cube 22 is coated the same as combiner cube 28 but the transmission of P-polarization at 488-514 nm is 95.5% with S-polarization transmission still below 0.2%. The transmitted 488-514 nm from splitter 26 is then transmitted through a ¼" round zero order halfwave plate optimized for use at 501 nm, designated 84, which is combined at combiner means 22, similar to combiner means 22 of FIG. 3, and is transmitted to ¼" round zero order halfwave plate optimized for use at 501 nm, designated 86, and then to the dye laser which thereafter transmits the red light beam component to its modulator $M_1$ which is reflected 99.5% at mirror 88 and transmitted through 1" cylindrical lens 90, 300 mmFL, transmission 99.5% at 595-640 nm. The unmodulated light is reflected via mirror 92 and transmitted to beam stop $B_2$. All of these light beam components are thereby transmitted to a lens 94, similar to $L_4$ in FIG. 1, then to the scanning mirror 96 and onto the lenses 98, 100 and 102 that are 454-640 nm AR coated high power achromats with various focal lengths as discussed previously, and finally to frame scanner 104 to the viewing surface 106.

All of the optics disclosed in this invention are available from Rocky Mountain Instrument Company of Longmont, Colo., except for scanner 96 that is available from Lincoln Laser of Phoenix, Ariz.; Speedring Systems of Rochester Hills, Mich.; or GEC Ferranti, Scotland; as well as others.

The electronics for running the preferred embodiment of the invention is similar to the electronics disclosed in U.S. Pat. No. 4,979,030 which is incorporated by reference herein for all purposes. In particular, FIG. 8 and columns 1 and 2 of U.S. Pat. No. 4,979,030 discloses a control system for the light projection apparatus of the present invention.

The foregoing disclosure and description of the invention are illustrative and explanatory thereof, and various changes in the size, shape and materials, as well as in the details of the illustrated construction may be made without departing from the spirit of the invention.

We claim:

1. In a light projection apparatus in which a primary laser means, a dye laser means and light separation means are provided for producing red, green and blue light beam components and in which a scanning means is provided to receive light from the primary laser means and to project the light onto a viewing surface, the improvement which comprises
   a secondary laser means for producing a second blue light beam component, and
   combiner means for combining a portion of said second blue light beam component with a portion of the blue light beam component produced by the primary laser means to operably project a brighter light onto the viewing surface.

2. Apparatus of claim 1 wherein the secondary laser means produces a second green light beam component and a portion of the second green light beam component being transmitted to the dye laser means to produce the red light beam component.

3. Apparatus of claim 2 further comprising
   polarization means for polarizing the green light beam component produced by the primary laser means, and means for positioning said polarization means between the primary laser means and the dye laser means.

4. Apparatus of claim 2 further comprising
polarization means for polarizing the second green light beam component, and
means for positioning said polarization means between said secondary laser means and the dye laser means.

5. Apparatus of claim 1 further comprising
reflective means disposed between the primary or secondary laser means and the dye laser means for adjusting the green light beam component produced by the primary or secondary laser means.

6. Apparatus of claim 1 further comprising
rotatable reflective means for adjusting the portion of the green light beam component of the primary or secondary laser means light beam transmitted to the dye laser means while allowing transmission of a portion of the green light beam component to the scanning means.

7. Apparatus of claim 1 further comprising
polarization means for polarizing the blue light beam component produced by the primary laser means, and
means for positioning said polarization means between the primary laser means and said combiner means.

8. Apparatus of claim 2 further comprising
a second combiner means for combining a portion of the primary laser means green light beam component with the second green light beam component transmitted to the dye laser means.

9. Apparatus of claim 2 further comprising
a splitter means for splitting the second blue light beam component and the second green light beam component produced by said second laser means.

10. Apparatus of claim wherein the light projected onto the viewing surface provides an infinite focus wherein the image will maintain focus at any desired distance from the apparatus output to infinity on any viewing surface.

11. In a light projection apparatus in which a primary laser means produces a primary blue light beam component and in which a scanning means is provided to receive light from the laser means to project the blue light beam component onto a viewing surface, the improvement which comprises
a secondary laser means for producing a second blue light beam component, and
combiner means for combining a portion of said second blue light beam component with a portion of primary blue light beam component to operably provide a combined blue light beam component for projection onto the viewing surface.

12. Apparatus of claim 11 further comprising means for adjusting the proportion of one of the blue light beam components that is projected onto the viewing surface.

13. Apparatus of claim 11 further comprising
rotatable reflective means for adjusting the proportion of the blue light beam component transmitted to the combiner means.

14. Apparatus of claim 11 further comprising
polarization means for polarizing the blue light beam component produced by the primary or secondary laser means, and
means for positioning said polarization means between the primary or secondary laser means and said combiner means.

15. Apparatus of claim 11 wherein substantially all of the second blue light beam component and primary blue light beam component are combined by the combiner means.

16. In a light projection apparatus in which a primary laser means for producing a primary light beam component and in which a scanning means is provided to receive the light beam component and to project the light into a viewing surface, the improvement which comprises
a secondary laser means for producing a second light beam component having the substantially same color as the primary light beam component, and
combiner means for combining a portion of the primary light beam component and a portion of the second light beam component to operably project the combined light beam components onto the viewing surface.

17. Apparatus of claim 16 wherein one of the laser means is a krypton ion laser and the combined light beam component is blue.

18. Apparatus of claim 16 further comprising a light beam produced by one of the laser means, and a dye laser means receiving said primary or secondary laser means light beam component to produce a red light beam component.

19. Apparatus of claim 18 wherein one of the laser means produces a green light beam component and the green light beam component being transmitted to the dye laser means to produce the red light beam component.

20. Apparatus of claim 18 further comprising
the primary laser means producing a green light beam component,
polarization means for polarizing the green light beam component produced by the primary laser means, and
means for positioning said polarization means between the primary laser means and the dye laser means.

21. Apparatus of claim 18 further comprising
polarization means for polarizing said secondary laser means green light beam component, and
means for positioning said polarization means between said secondary laser means and the dye laser means.

22. Apparatus of claim 18 further comprising
reflective means for adjusting the green light beam component produced by one of the laser means.

23. Apparatus of claim 18 further comprising
rotatable reflective means for adjusting the portion of the green light beam component of one of the laser means light beam transmitted to the dye laser means while allowing transmission of a portion of the green light beam component to the scanning means.

24. Apparatus of claim 16 wherein the light beam component produced by both laser means is a red light beam component, the apparatus further comprising
the primary laser means producing a primary blue light beam component,
the secondary laser means producing a second blue light beam component, and
a second combiner means for combining a portion of said primary blue light beam component and a portion of said second blue light beam component.

25. Apparatus of claim 16 further comprising
said secondary laser means producing a second light beam, and
a splitter means for splitting the second light beam to produce a second green light beam component and a second blue light beam component.

* * * * *